United States Patent
Choi

(10) Patent No.: US 8,717,522 B2
(45) Date of Patent: May 6, 2014

(54) METHOD FOR FABRICATING LIQUID CRYSTAL DISPLAY PANEL USING THE SAME

(75) Inventor: Byoung Chul Choi, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 1780 days.

(21) Appl. No.: 11/317,235

(22) Filed: Dec. 27, 2005

(65) Prior Publication Data

US 2006/0283388 A1 Dec. 21, 2006

(30) Foreign Application Priority Data

Jun. 20, 2005 (KR) .................. 10-2005-0053197

(51) Int. Cl.
*G02F 1/1337* (2006.01)
*H01L 21/00* (2006.01)

(52) U.S. Cl.
USPC .............. 349/123; 349/126; 438/30; 118/719

(58) Field of Classification Search
USPC .................................................. 156/345.31
See application file for complete search history.

(56) References Cited

U.S. PATENT DOCUMENTS

| 5,384,952 | A | * | 1/1995 | Matsui | 29/840 |
| 7,248,346 | B2 | * | 7/2007 | Ho et al. | 356/36 |
| 2002/0092368 | A1 | * | 7/2002 | Nishimura et al. | 73/865.8 |
| 2003/0179332 | A1 | * | 9/2003 | Choi et al. | 349/123 |
| 2004/0001177 | A1 | * | 1/2004 | Byun et al. | 349/187 |
| 2005/0007502 | A1 | * | 1/2005 | Lee | 349/1 |

* cited by examiner

*Primary Examiner* — Karla Moore
*Assistant Examiner* — Nathan K Ford
(74) *Attorney, Agent, or Firm* — McKenna Long & Aldridge, LLP

(57) ABSTRACT

An apparatus for forming an alignment film and a method for fabricating a liquid crystal display panel using the same are disclosed. A steam inspecting unit for inspecting a defective alignment film is disposed for two lines of rubbing equipment, so that a facility investment expense can be reduced and a space of a clean room can be effectively utilized. The apparatus for forming an alignment film comprises a rubbing equipment comprising at least one rubbing unit; and an alignment film inspecting unit installed between the two lines of rubbing equipment and inspecting an alignment film formed on a substrate.

6 Claims, 6 Drawing Sheets

METHOD FOR FABRICATING LIQUID CRYSTAL DISPLAY PANEL USING THE SAME

This application claims the benefit of the Korean Patent Application No. P2005-0053197, filed on Jun. 20, 2005, which is hereby incorporated by reference for all purposes as if fully set forth herein.

BACKGROUND OF THE INVENTION

1. Field of the Invention

The present invention relates to an apparatus for forming an alignment film and, more particularly, to an apparatus for forming an alignment film capable of allowing commonly using of a rubbing steam inspecting unit for inspecting a defect of an alignment film formed on a substrate used for a liquid crystal display panel and, a method for fabricating the liquid crystal display panel using the same.

2. Description of the Related Art

Recently, as the demand for information displays has increased, especially for the use in portable (mobile) information devices, research and development of light thin flat panel displays (FPD), which can replace the CRT (Cathode Ray Tube), the existing display device, have increased.

Among FPDs, LCDs, devices for displaying images using optical anisotropy of liquid crystal, exhibit excellent resolution and color and picture quality, so LCDs are widely used in notebook computers, desktop monitors or the like.

In general, the LCD device is a display device in which a data signal according to image information is separately supplied to liquid crystal cells arrange din a matrix form to control optical transmittance of the liquid crystal cells to thereby display a desired image.

The LCD device will now be described with reference to FIG. 1.

FIG. 1 is an exploded perspective view illustrating the structure of a related art LCD device.

As illustrated, the LCD device comprises a color filter substrate 5, a first substrate, an array substrate 10, a second substrate, and a liquid crystal layer 40 formed between the color filter substrate 5 and the array substrate 10.

The color filter substrate 5 comprises a color filter (C) comprised of red (R), green (G) and blue (B) sub-color filters 7, a black matrix 6 separating the sub-color filters (C) and blocking light transmitted through the liquid crystal layer 40, and a transparent common electrode 8 applying a voltage to the liquid crystal layer 40.

On the array substrate 10, there are formed gate lines 16 and data lines 17 arranged vertically and horizontally to define pixel regions (P). A thin film transistor (TFT), a switching device, is formed at the crossing of the gate line 16, and a pixel electrode 18 is formed at each pixel region (P).

The pixel region (P) is a sub-pixel corresponding to a single sub-color filter 7, and a color image is obtained by combining three types of red, green and blue colors. Namely, the three red, green and blue sub-pixels make one pixel, and the TFT (T) is connected to the red, green and blue sub-pixels.

An alignment film (not illustrated) for aligning liquid crystal molecules of the liquid crystal layer is formed on the color filter substrate 5 and the array substrate 10.

FIG. 2 illustrates a method for forming the alignment film using a roll printing method.

As illustrated, generally, an alignment film is formed using a printing method using a plurality of rolls. Namely, an alignment solution 24 is supplied between a cylindrical anylox roll 22 and a doctor roll 23 and when the anylox roll 22 and the doctor roll 23 are rotated, the alignment solution 24 is uniformly coated entirely on the anylox roll 22. In this case, the alignment solution 24 is supplied by a dispenser 1 in an injector type.

The anylox roll 22 is rotated in contact with a printing roll 24 with a rubber plate 25 attached on a certain region of its surface, and the alignment solution 24 on the anylox roll 22 is transferred to the rubber plate 25. The rubber plate 25 corresponds to a substrate 26 on which the alignment solution 24 is to be coated, and has a master pattern to allow the alignment film to be selectively printed on the substrate.

As a printing table 27 with the substrate 26 loaded thereon is moved in contact with the printing roll 24, the alignment solution 24 which has been transferred to the rubber plate 25 is re-transferred onto the substrate 26 to thereby form an alignment film. Generally, the alignment film has the thickness of 500~1000 Å, and in this respect, even a thickness difference of about 100 Å can cause a defect such as a blot (spot) on a screen of the LCD device according to the non-uniformed alignment, so uniformly coating of the alignment film is a critical factor for determining characteristics of the screen.

Next, with the alignment film formed on the substrate, the alignment film is rubbed to arrange liquid crystals in a certain direction to form valleys in a certain direction.

FIG. 3 is a perspective view illustrating a related art rubbing process.

As illustrated, the alignment film 21 is rubbed to form the recesses 36 on the surface thereof. The rubbing process refers to rubbing the surface of the alignment film 21 in a certain direction using a roller 30 with a rubbing cloth 35 wound thereon.

When the surface of the alignment film 21 is rubbed, it has fine recesses 36.

As the rubbing cloth 35, a soft cloth is used, and a rubbing equipment including the roller 30 is relatively simple. The basic part for setting conditions for the rubbing process is setting a rubbing condition with a suitable strength and applying a uniform rubbing strength on a large area.

If the rubbing is not uniform, an alignment degree of liquid crystal molecules is not spatially uniform, causing a defect that optical characteristics are different at a certain portion.

The inspecting of a defective alignment after rubbing is generally performed such that the rubbing state of the alignment 21 is inspected with the naked eyes by reflecting light on the surface of the substrate 26, or liquid crystal is dropped on the alignment film 21, the upper and lower substrates are allowed to overlap and a color change or a light and shade difference is inspected with the naked eyes.

However, the method for inspecting the alignment film with the naked eyes using the light reflection has a low reliability, and the method for using liquid crystal has a degraded process yield because a large amount of liquid crystal is consumed and the substrate used for the inspecting is to be discarded.

BRIEF DESCRIPTION OF THE INVENTION

Therefore, one advantage of the present invention is to provide an apparatus for forming an alignment film having an alignment film inspecting equipment capable of enhancing reliability of inspecting uniformity of an alignment film and also enhancing a process yield without damaging a substrate, and a method for fabricating a liquid crystal display panel using the same.

Another advantage of the present invention is to provide an apparatus for forming an alignment film capable of reducing a facility investment expense and effectively utilizing a space of a clean room by commonly using an alignment film inspecting equipment.

To achieve these and other advantages and in accordance with the purpose of the present invention, as embodied and broadly described herein, there is provided an apparatus for forming an alignment film comprising: a rubbing equipment comprising at least one rubbing unit; and an alignment film inspecting unit installed between two lines of rubbing equipment and inspecting an alignment film formed on a substrate.

To achieve the above advantages, there is also provided a method for forming an alignment film comprising: forming an alignment film on a surface of a substrate; performing rubbing on the alignment film-formed substrate using a rubbing equipment; and inspecting the alignment film formed on the substrate using an alignment film inspecting unit installed between two lines of rubbing equipment.

To achieve the above advantages, there is also provided a method for fabricating a liquid crystal display panel comprising: providing a substrate; performing an array process or a color filter process on the substrate; forming an alignment on a surface of the substrate; performing rubbing on the substrate using a rubbing equipment; inspecting the alignment film on the substrate using an alignment film inspecting unit installed between two lines of rubbing equipment; attaching the two substrates which have completely undergone the alignment inspecting; and cutting the attached substrates into a plurality of unit liquid crystal display panels.

The foregoing and other features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to embodiments of the present invention, examples of which are illustrated in the accompanying drawings.

The apparatus for forming an alignment film and a method for fabricating a liquid crystal display panel using the same in accordance with exemplary embodiments of the present invention will now be described with reference to the accompanying drawings.

Figure 1:
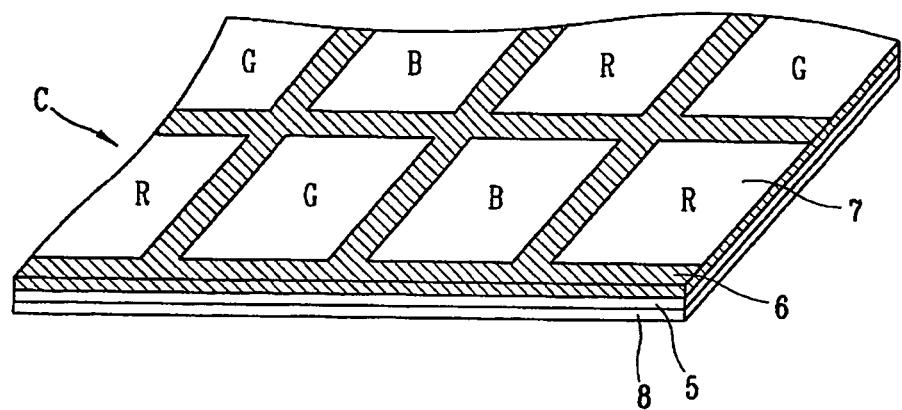
FIG. 1 illustrates the structure of a related art liquid crystal display (LCD) device.
Figure 1:
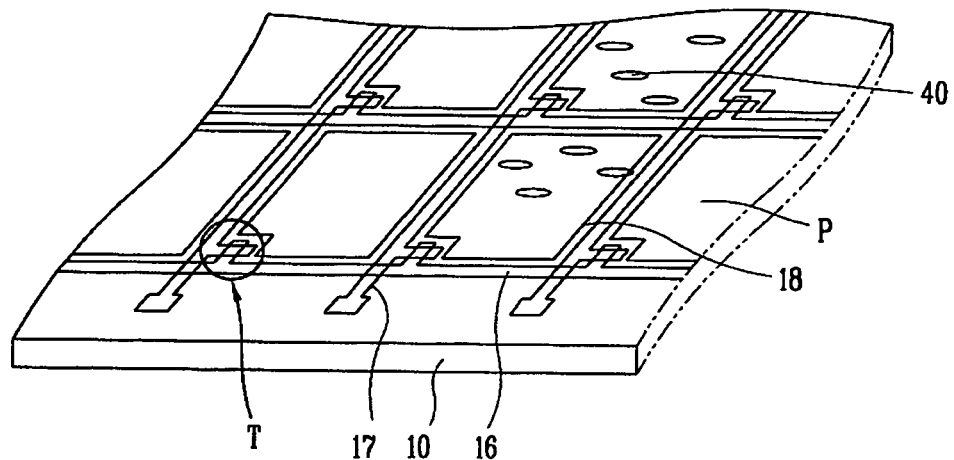
Figure 2:
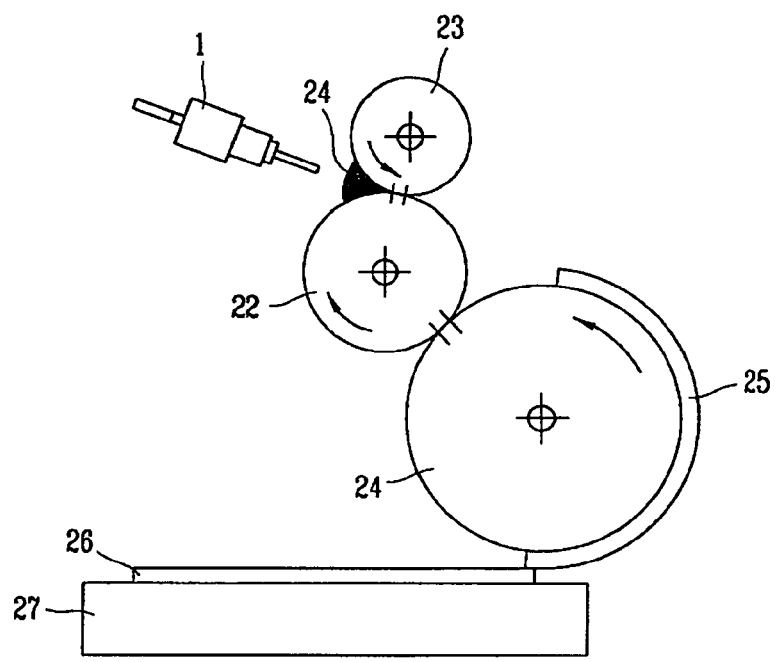
FIG. 2 illustrates a method for forming an alignment film using a roll printing method.
Figure 3:
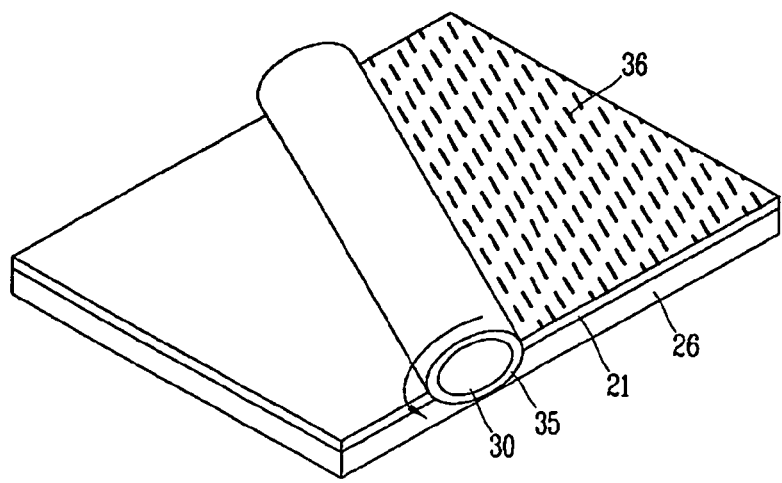
FIG. 3 is a perspective view illustrating a related art rubbing process.
Figure 4:
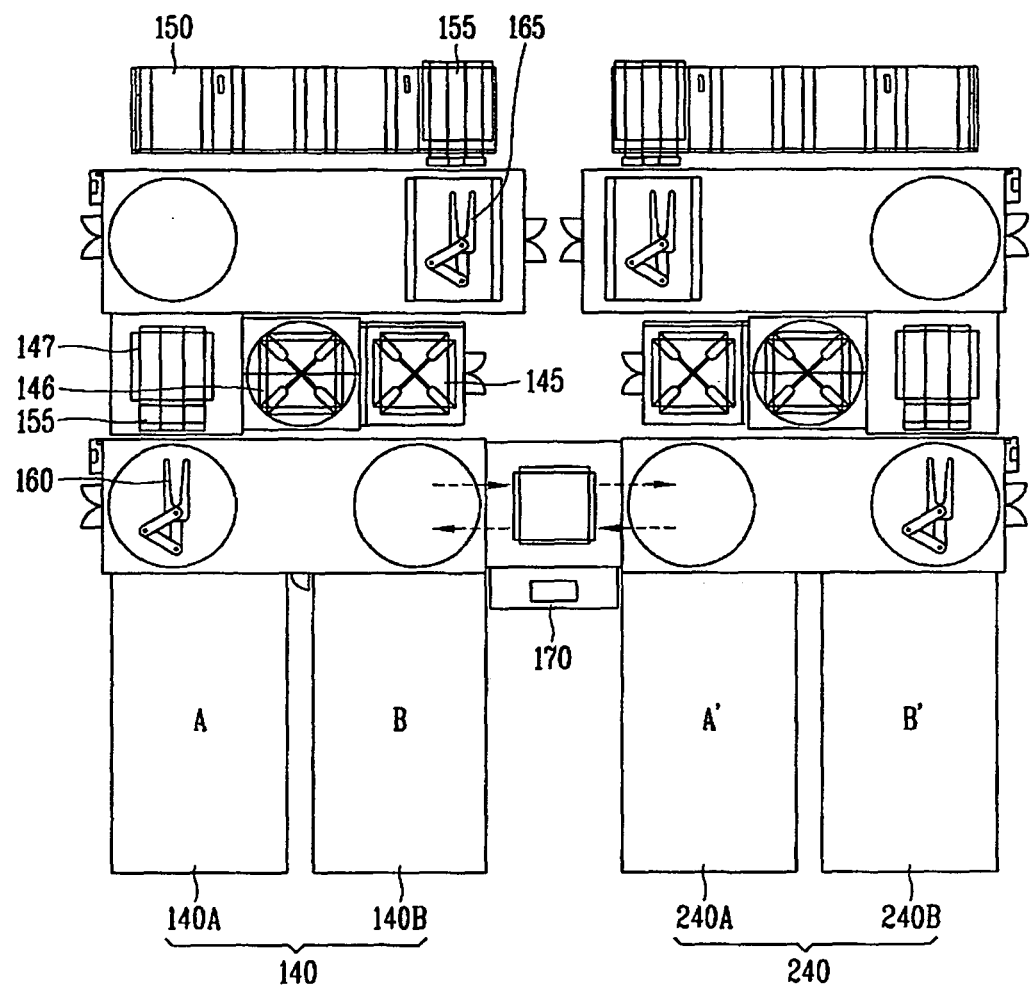
FIG. 4 is an exemplary view illustrating an apparatus for forming an alignment film in accordance with an embodiment of the present invention.

FIG. 4 is an exemplary view illustrating an apparatus for forming an alignment film in accordance with an embodiment of the present invention.

As illustrated, the apparatus for forming an alignment film has a structure that an alignment film inspecting unit 170 is installed between two lines of rubbing equipment 140 and 240 in order to maximize the rate of operation of the alignment film inspecting unit 170.

The rubbing equipment 140 and 240 are used to form an alignment film on a substrate for a liquid crystal display panel, and the rubbing equipment 140 and 240 has two rubbing units 140A and 140B and 240A and 240B, respectively. However, the present invention is not limited thereto and each of the rubbing equipment 140 and 240 can include one or three ribbing units.

The rubbing equipment 140 and 240 perform rubbing on an array substrate or on a color filter substrate with an alignment film formed thereon to align the alignment film in a specific direction. The array substrate or the color filter substrate with the alignment film formed thereon are received in a cassette 155 and conveyed to a loader 150 of the rubbing equipment 140 and 240. The loader 150 is where the cassette 155 with the substrates received therein waits for, and includes a port, at which each cassette is mounted, provided at an upper portion thereof.

The glass substrates received in the cassette 155 are taken out one by one through a first robot arm 165 positioned at the side of the loader 150 and moved to a align/turn unit 146. The align/turn unit 146 serves to align a position of the substrates loaded by the first robot arm 165. Liquid crystal molecules are to be aligned at a certain angle according to a driving model on a liquid crystal display panel and, in this respect, the align/turn unit 146 adjusts the position of the loaded substrates according to the alignment angle.

Left and right sides of the align/turn unit 146 are a buffer 147 and a ultra sonic cleaner (USC) 145 serving as a cleaning equipment for performing cleaning.

The buffer 147 is where substrates temporarily wait before being subjected to the rubbing process. The USC 145 cleans the substrates before or after the rubbing process. As for the cleaning of the substrates, dry cleaning is performed on the substrates before the rubbing process, and wet cleaning is performed after the rubbing process.

When the substrates are completely cleaned, they are conveyed to the rubbing units 140A, 140B, 240A and 240B through the second robot arm 160, and the first rubbing units 140A and 240A or the second rubbing units 140B and 240B perform the rubbing process according to whether they are operated.

The alignment film inspecting unit 170 is installed between the two lines of rubbing equipment 140 and 240 in order to check whether the rubbed alignment film is defective or not.

In this embodiment of the present invention, in order to maximize the rate of operation of the alignment film inspecting unit 170, the single alignment film inspecting unit 170 is installed for the two lines of rubbing equipment 140 and 240, and therefore, when a new factory is set up, an installation investment expense can be reduced and the space of a clean room can be effectively utilized.

As the size of glass and rubbing roller is increased, a monitoring function with respect to quality of the rubbing process is gaining importance, and accordingly, the alignment film inspecting unit 170 for monitoring the rubbing process is also increased in size. The enlargement in the facility and the importance of the monitoring function lead to increase in the facility investment expense with respect to the alignment film inspecting unit 170 and also increase in the area of the clean room. In line with this, in this embodiment of the present invention, only the single alignment film inspecting unit 170 is installed with respect to the two lines of rubbing equipment 140 and 240, so the installation number of alignment film inspecting unit can be reduced, and thus, the facility investment expense and the area of the clean room can be reduced.

In addition, in this embodiment of the present invention, since the substrates which have been rubbed through the plurality of rubbing units 140A, 140B, 240A and 240B installed in the two lines are sequentially inspected, the alignment film inspecting unit 170 is operated without being stopped, so the rate of operation of the alignment film inspecting unit 170 can be improved. Namely, the alignment film inspecting unit 170 is installed between the two lines of rubbing equipment 140 and 240 and sequentially receives the substrates which have been rubbed through the plurality of rubbing units 140A, 140B, 240A and 240B installed in respective rubbing equipment 140 and 240, and performs the inspecting on the rubbed substrates.

As the alignment film inspecting unit 170, a steam inspecting unit is used in the present invention. The steam inspecting unit will be described in detail as follows.

In this embodiment, the steam inspecting unit 170 includes a steam generator (not illustrated) therein. In the steam inspecting unit, a surface of the substrate on which the alignment film is formed is exposed to the steam generator to apply steam onto the surface of the substrate, and non-uniformity such as a color change, a light and shade difference or formed water drops are observed to thereby check uniformity of the alignment film. In this manner, the steam inspecting unit 170 in this embodiment performs the inspecting, so the inspecting process is simple and the process yield can be improved because the substrate is not damaged.

The inspecting of the alignment using the steam inspecting unit 170 is performed in the following order.

First, the alignment-formed substrate is positioned on the steam generator. In this case, the substrate is installed to be slanted at a certain angle, e.g., at about 40°~50°, toward the steam generator to facilitate steaming up and its observation.

And the steam generator heats distilled water at a certain temperature, e.g., at about 80° C.~100° C. to generate steam to make the alignment film of the substrate steamed up.

In this manner, the steamed substrate is observed from the opposite side with the naked eyes or using an observation equipment, for example, a camera unit or the like, to check non-uniformity such as a color change, a light and shade difference or formation of water drops, to thus check uniformity of the alignment film.

Through the inspecting, a fine defect or contamination by an impurity of the alignment film can be also checked. The above descriptions consider the case where the inspecting is performed after the rubbing process; however, the inspecting can be performed before the rubbing process.

The method for forming the alignment film using the apparatus for forming the alignment film and the method for fabricating the liquid crystal display panel will now be described in detail with reference to the accompanying drawings.

Figure 5:
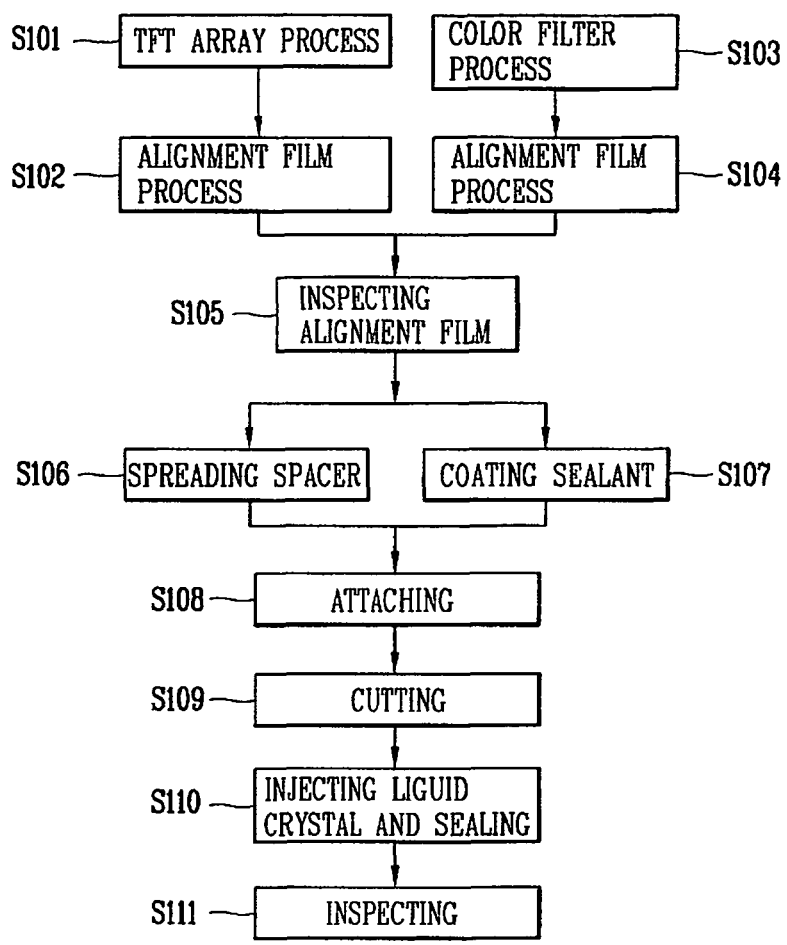
FIG. 5 is a flow chart illustrating a sequential process of a method for fabricating a liquid crystal panel in accordance with a first embodiment of the present invention.
Figure 6:
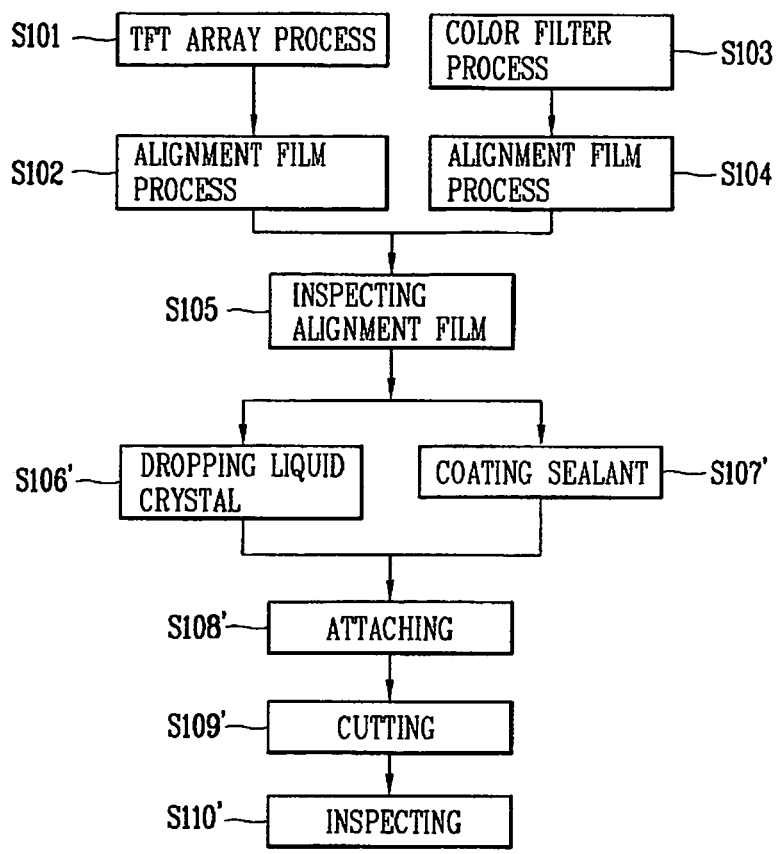
FIG. 6 is a flow chart illustrating a sequential process of a method for fabricating a liquid crystal panel in accordance with a second embodiment of the present invention.

FIG. 5 is a flow chart illustrating a sequential process of a method for fabricating a liquid crystal panel in accordance with a first embodiment of the present invention, and FIG. 6 is a flow chart illustrating a sequential process of a method for fabricating a liquid crystal panel in accordance with a second embodiment of the present invention.

The first embodiment of the present invention illustrates a method for fabricating a liquid crystal display panel in which a liquid crystal layer is formed using a liquid crystal injection method, while the second embodiment of the present invention illustrates a method for fabricating a liquid crystal display panel in which a liquid crystal layer is formed using a liquid crystal dropping method.

The process for fabricating the liquid crystal display panel can be divided into a driving device array process for forming a driving device on the lower array substrates, a color filter process for forming a color filter on the upper color filter substrate, and a cell process for attaching the array substrate and the color filter substrate.

To begin with, a plurality of gate lines and a plurality of data lines arranged vertically and horizontally to define pixel regions on the lower substrate are formed and a TFT, a driving device, is formed to be connected with the gate lines and the data lines at each of the pixel regions through the array process (step S101). In addition, a pixel electrode which is connected with the TFT and drives the liquid crystal layer as a signal is applied thereto through the TFT is formed through the array process.

A color filter layer comprising red, green and blue sub-color filters implementing color and a common electrode are formed on the upper substrate through the color filter process (step S103).

Subsequently, after an alignment film is coated on the upper and lower substrates, it is aligned using the alignment film forming apparatus of the present invention in order to provide an anchoring force or a surface fixing force (namely, a pretilt angle and an alignment direction) to liquid crystal molecules of a liquid crystal layer formed between the upper and lower substrates (step S102 and S104). In this case, as the alignment processing method, a rubbing method or photo alignment method can be used.

And then, the rubbing process-finished upper and lower substrates are inspected using the alignment film inspecting unit installed in the alignment film forming apparatus as to whether the alignment film is defective or not (step S105).

In addition, as mentioned above, in the present invention, as the alignment film inspecting unit, the steam inspecting unit is used, and the alignment film inspecting unit is installed between the two lines of the rubbing equipment. In addition, the alignment film inspecting using the alignment film inspecting unit can be performed several times according to a proceeding situation of the process, and the alignment film inspecting method will now be described in detail with reference to the accompanying drawings.

Figure 7:
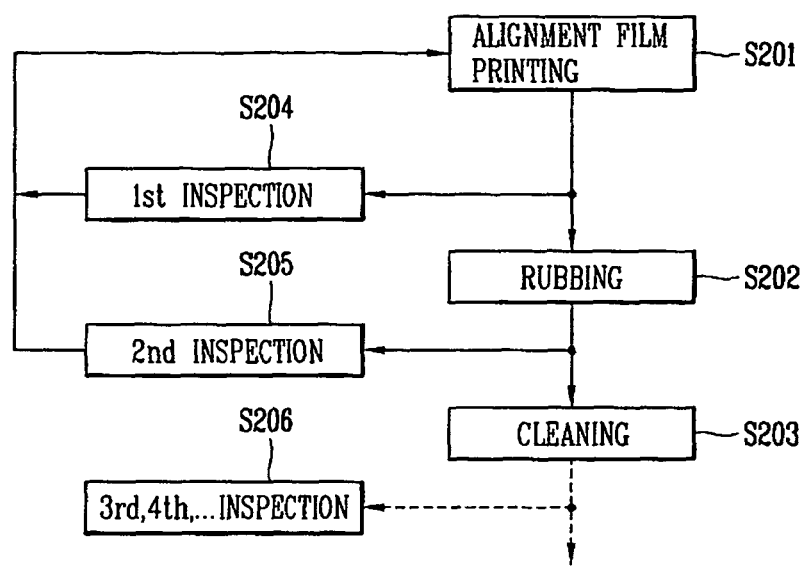
FIG. 7 is a flow chart illustrating a sequential process of a method for inspecting the alignment film in accordance with an embodiment of the present invention.

FIG. 7 is a flow chart illustrating a sequential process of a method for inspecting the alignment film in accordance with an embodiment of the present invention.

The liquid crystal display panel uses the electro-optic effects of liquid crystal, and since the electric optical effect is determined by anisotropy of the liquid crystal itself and a state of arrangement of liquid crystal molecules, controlling of the arrangement of liquid crystal molecules has much influence on stabilization of a display quality of the liquid crystal display panel.

Accordingly, the alignment film forming process and the rubbing process for effectively aligning liquid crystal molecules are of much importance with respect to characteristics of picture quality in the liquid crystal cell process.

First, an alignment film is formed on each of the upper and lower substrates which have been fabricated through the above-described array process and the color filter process and then rubbed to provide the alignment control force or the surface fixing force to the liquid crystal molecules of the liquid crystal layer (steps S201 and S202).

In this case, the rubbing process refers to a process for arranging a fired alignment film in a certain direction so that liquid crystals can be arranged in a certain direction by a rubbing cloth.

When the surface of the alignment film is rubbed, the surface of the alignment film has fine recesses.

The rubbing cloth used for the rubbing process includes a soft cloth, and the basic part for setting conditions for the rubbing process is setting a rubbing condition with a suitable strength and applying a uniform rubbing strength on a large area.

The rubbing cloth is formed such that the weft and the warp thread cross finely, and the surface of the rubbing cloth can be damaged by a pattern formed on the substrate or debris while the surfaces of the plurality of substrates are being rubbed.

Thus, when the alignment film is not uniformly rubbed during the rubbing process using the damaged rubbing cloth, an alignment degree of liquid crystal molecules is not uniformed spatially, resulting in a defective alignment film on which optical characteristics are different at a part.

The method for inspecting the defective rubbing includes a first inspecting for inspecting whether there exists a blot, a line pattern or a pin hole on the surface of the coated alignment film (step S204) and a second inspecting for inspecting whether the surface of the rubbed alignment film has uniformity and a scratch or the like (step S205).

The first and second inspecting can be performed using the alignment film inspecting unit installed in the alignment film forming apparatus. In this case, when the substrates are completely rubbed in the plurality of rubbing units provided in the alignment film forming apparatus are sequentially moved to the alignment film inspecting unit, and the alignment film inspecting unit which uses steam sprays steam onto the surface of the rubbed alignment film to check whether the alignment film has been defectively rubbed.

In this case, since the alignment film inspecting unit is installed between the two lines of rubbing equipment, the number of alignment film inspecting units for a facility investment can be reduced, and since the substrate which has been rubbed using the rubbing equipment can be inspected without waiting for, the rate of operation of the steam inspecting unit can be improved.

After the alignment film is printed, rubbed and subjected to the first and second inspecting, the substrate undergoes cleaning (S203) and then conveyed to the next process unit. In this respect, however, despite the alignment film being inspected two times before assembling the liquid crystal panel, when the final inspecting is performed on the liquid crystal display panel which has been subjected to the processes such as assembling, cutting and liquid crystal injection, defects such as a blot, an alignment damage, a dot defect, and non-uniform alignment, which have not detected through the first and second inspecting processes, can still appear.

Thus, in order to remove such defects, third or fourth additional inspections can be performed according to the process situation even after the first and second inspecting is finished (step S206).

After inspection of the alignment film is finished, spacers for uniformly maintaining a cell gap spread on the lower substrate and a sealant is coated on an outer edge of the upper substrate. And then, the lower and upper substrates are attached by applying a pressure thereto (steps S106~S108).

The lower and upper substrates are formed as large-scale glass substrates. In other words, a plurality of panel regions are formed on the large-scale glass substrates, and the TFT, the driving device, and the color filter layer are formed at each panel region. Thus, in order to obtain a unit liquid crystal display panel, the glass substrates are to be cut and processed (step S109). Thereafter, liquid crystal is injected through a liquid crystal injection opening of each unit liquid crystal display panel, the liquid crystal injection opening is sealed to form a liquid crystal layer, and then, each unit liquid crystal display panel is inspected, thereby finishing fabrication of each of the unit liquid crystal display panels (steps S110 and S111).

The liquid crystal is injected using a vacuum injection method using a pressure difference. That is, according to the vacuum injection method, the liquid crystal injection opening of the unit liquid crystal display panel separated from the large-scale mother substrates is put in a container filled with liquid crystal in a chamber with a certain degree of vacuum, and then, the degree of vacuum is changed to allow liquid crystal to be injected into the liquid crystal display panel according to a pressure difference between the interior and the exterior of the liquid crystal display panel. When the liquid crystal is filled inside the liquid crystal display panel, the liquid crystal injection opening is sealed to form the liquid crystal layer of the liquid crystal display panel. Thus, in order to form the liquid crystal layer at the liquid crystal display panel through the vacuum injection method, a portion of a seal pattern needs to be opened to serve as the liquid crystal injection opening.

However, the vacuum injection method has the following problem.

First, it takes a long time to fill the liquid crystal in the liquid crystal display panel. In general, since the attached liquid crystal display panel has an area of hundreds of cm² and a gap of merely about a few μm, the amount of injected liquid crystal per unit hour is inevitably small when the vacuum injection method using the pressure difference is employed. For example, about 8 hours are required for filling liquid crystal for fabricating an about 15-inch liquid crystal display panel. That is, since that much time is required for fabrication of the liquid crystal display panel, the productivity is degraded. In addition, as the liquid crystal display panel is increased in size, time taken for filling liquid crystal would be more lengthened and a defective filling of liquid crystal would also occur, resulting in that it cannot cope with the enlargement of the liquid crystal display panel.

Second, a large amount of liquid crystal is used. In general, the amount of liquid crystal actually injected into the liquid crystal display panel is quite small compared with the amount of liquid crystal filled in the container, and when liquid crystal is exposed in the air or exposed to a specific gas, it is reacted to the gas and degraded. Thus, although the liquid crystal filled in the container is filled in the plurality of unit liquid crystal display panels, a large amount of liquid crystal remaining after finishing the filling is discarded, and accordingly, the unit cost of the liquid crystal panel is increased only to weaken price competitiveness of the product.

In order to solve the problem of the vacuum injection method, the dropping method is increasingly employed in its place.

As illustrated in FIG. 6, in case of the second embodiment using the dropping method, after the alignment film is inspected (step S105), a certain seal pattern is formed with a sealant on the color filter substrate and, at the same time, a liquid crystal layer is formed on the array substrate (steps S106' and S107').

According to the dropping method, after liquid crystal is dropped and dispensed on the large-scale first mother substrate where a plurality of array substrates are disposed or on an image display region of the second mother substrate where the plurality of color filter substrates are disposed, the first and second mother substrates are attached by applying a certain pressure thereto to thereby make the liquid crystal uniformly distributed to the entire image display region and thus form a liquid crystal layer.

Thus, in the case where the liquid crystal layer is formed in the liquid crystal display panel through the dropping method, the seal pattern must be formed as a closed pattern surrounding the outer edge of the pixel part region in order to prevent a leakage of liquid crystal to outside of the image display region.

The dropping method allows dropping of liquid crystal within a relatively short time compared with the vacuum injection method and can quickly form the liquid crystal even when the liquid crystal display panel is large.

In addition, since the only required amount of liquid crystal is dropped on the substrate, such an increase in the unit cost of the liquid crystal display panel according to discarding of the high-priced liquid crystal as in the vacuum injection method can be prevented, and thus, the price competitiveness of the product can be enhanced.

Thereafter, in a state that the upper and lower substrates on which liquid crystal has been dropped and the sealant has been coated are aligned, a pressure is applied thereto to make the lower and upper substrate attached by the sealant and simultaneously the dropped liquid crystal spread uniformly on the entire portion of the panel (step S108').

Through the process, the plurality of liquid crystal display panels with the liquid crystal layer formed thereon are formed on the large-scale glass substrates (upper and lower substrates). The glass substrates are processed and cut to be separated into the plurality of liquid crystal display panels, which are then inspected to thereby finish fabrication of the liquid crystal display panel (steps S109' and S110').

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display panel comprising:
    providing at least two substrates;
    performing an array process or a color filter process on the substrates;
    providing an apparatus for forming an alignment film, wherein an alignment film inspecting unit is installed between two lines of rubbing equipment,
        wherein the two lines of rubbing equipment have two rubbing units, respectively,
        wherein the apparatus includes a loader, an align/turn unit, a buffer, a cleaning unit, the alignment film inspecting unit and the two rubbing units for each line, and
        wherein the buffer is installed at one side of the align/turn unit and the cleaning unit is installed at the other side of the align/turn unit;
    forming an alignment film on a surface of the substrates that have been array processed or color filter processed;
    aligning the alignment film-formed substrates at a predetermined angle using the align/turn unit;
    temporarily waiting the substrates in the buffer before subjecting the substrates to a rubbing process;
    cleaning the substrates before and after the rubbing process;
    performing the rubbing process on the cleaned substrates using the two rubbing units;
    sequentially providing rubbed substrates to the alignment film inspecting unit from the two lines of rubbing equipment in two directions;
    positioning received substrates on a steam generator in the alignment film inspecting unit, wherein each substrate is positioned to be slanted at a predetermined angle toward the steam generator;
    applying steam onto a front surface of the substrates on which the alignment film is formed;
    inspecting the alignment film by observing the substrates from a back surface of the substrates using the alignment film inspecting unit;
    measuring uniformity of the alignment film by measuring a color change or a light and shade difference;
    attaching the two substrates which have completely undergone the alignment film inspecting step; and
    cutting the attached substrates into a plurality of unit liquid crystal display panels.

2. The method of claim 1, wherein the step of forming the alignment film comprises:
    printing the alignment film on the surface of the substrates using a printing unit.

3. The method of claim 1, wherein the step of inspecting the alignment film of the substrates further comprises:
    measuring a state of the steamed surface of the substrates using a measurement device.

4. The method of claim 3, wherein, in the step of measuring the state of the steamed surface of the substrates, uniformity of the surface of the alignment film formed on the substrates is inspected to check whether there is a scratch, defect, or contamination.

5. The method of claim 1, wherein before the rubbing is performed on the substrates, the substrates are checked whether there is a blot, a line pattern or a pin hole on a surface of the alignment film formed on the substrates.

6. The method of claim 1, wherein after the rubbing is performed on the substrates, the substrates are checked whether the rubbed alignment film is defective or not.

* * * * *